US009409155B2

(12) United States Patent
Koo et al.

(10) Patent No.: US 9,409,155 B2
(45) Date of Patent: Aug. 9, 2016

(54) METAL STRUCTURE CATALYST AND PREPARATION METHOD THEREOF

(75) Inventors: Kee Young Koo, Daejeon (KR); Wang Lai Yoon, Daejeon (KR); Un Ho Jung, Daejeon (KR); Sang Ho Park, Daejeon (KR); Young Jae Hwang, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 269 days.

(21) Appl. No.: 13/980,895

(22) PCT Filed: Jul. 25, 2012

(86) PCT No.: PCT/KR2012/005904
§ 371 (c)(1), (2), (4) Date: Jul. 22, 2013

(87) PCT Pub. No.: WO2013/019013
PCT Pub. Date: Feb. 7, 2013

(65) Prior Publication Data
US 2013/0309165 A1 Nov. 21, 2013

(30) Foreign Application Priority Data

Jul. 29, 2011 (KR) .................. 10-2011-0075982
Jul. 17, 2012 (KR) .................. 10-2012-0077734

(51) Int. Cl.
*B01J 23/00* (2006.01)
*B01J 23/86* (2006.01)
(Continued)

(52) U.S. Cl.
CPC .............. *B01J 23/866* (2013.01); *B01J 23/002* (2013.01); *B01J 23/755* (2013.01); *B01J 37/035* (2013.01);
(Continued)

(58) Field of Classification Search
CPC ...... B01J 23/866; B01J 23/002; B01J 23/755; B01J 37/035; B01J 37/08; B01J 37/12; B01J 37/16; B01J 37/348; C01B 3/40

USPC ................................................. 502/325
See application file for complete search history.

(56) References Cited

U.S. PATENT DOCUMENTS

| 2004/0199019 A1 | 10/2004 | Schmidt |
| 2010/0125036 A1* | 5/2010 | Sharma ............... B01J 23/40 502/330 |

(Continued)

FOREIGN PATENT DOCUMENTS

| EP | 2409761 A1 | 1/2012 |
| GB | 1522191 A | 8/1978 |

(Continued)

OTHER PUBLICATIONS

Villegas et al., "Wet Impregnation of Alumina-Washcoated Monoliths: Effect of the Drying Procedure on Ni distribution and on autothermal reforming activity", Applied Catalysis A: General, Elsevier Science, Amsterdam, NL, vol. 320, Mar. 20, 2007, pp. 43-55.

(Continued)

*Primary Examiner* — Colleen Dunn
*Assistant Examiner* — Haytham Soliman
(74) *Attorney, Agent, or Firm* — Hammer & Associates, P.C.

(57) ABSTRACT

Provided are a metal structure catalyst and a method of preparing the same. Particularly, the method includes forming a metal precipitate on a metal support by contact of a mixed solution including a precursor of a metal catalyst and a precipitating agent with the metal support, and forming metal particles by thermally treating and reducing the metal precipitate formed on the metal support. The metal structure catalyst includes a metal support, a metal oxide layer formed on the metal support, and metal nanoparticles formed on the metal oxide layer. In addition, the metal nanoparticles are uniform and have enhanced binding strength.

12 Claims, 6 Drawing Sheets

(51) Int. Cl.
  *B01J 37/08* (2006.01)
  *B01J 23/755* (2006.01)
  *C01B 3/40* (2006.01)
  *B01J 37/03* (2006.01)
  *B01J 37/12* (2006.01)
  *B01J 37/16* (2006.01)
  *B01J 37/34* (2006.01)

(52) U.S. Cl.
  CPC *B01J 37/08* (2013.01); *B01J 37/12* (2013.01); *B01J 37/16* (2013.01); *B01J 37/348* (2013.01); *C01B 3/40* (2013.01); *B01J 2523/00* (2013.01); *C01B 2203/0233* (2013.01); *C01B 2203/0283* (2013.01); *C01B 2203/044* (2013.01); *C01B 2203/047* (2013.01)

(56) References Cited

U.S. PATENT DOCUMENTS

2010/0261600 A1\* 10/2010 Yoon ............... B01J 23/755 502/5
2011/0137030 A1   6/2011 Kubanek et al.

FOREIGN PATENT DOCUMENTS

| JP | 58-193734 A | 5/1985 |
| JP | 1993-186203 A | 7/1993 |
| JP | 2003340280 A | 12/2003 |
| JP | 2007-509234 A | 4/2007 |
| JP | 2007090241 A | 4/2007 |
| JP | 2011-31162 A | 2/2011 |
| KR | 100210011 B1 | 7/1999 |
| KR | 10-1019234 | 3/2011 |

OTHER PUBLICATIONS

Office Action issued on Oct. 6, 2014 against the corresponding Japanese Patent Application No. 2013-551925. "Notice of Reasons for Rejection".

Office Action issued on Aug. 31, 2015 against the corresponding Japanese Patent Application No. 2013-551925. "Notice of Reasons for Rejection".

Office Action issued on Apr. 25, 2016 against the corresponding Japanese Patent Application No. 2013-551925. "Notice of Reasons for Rejection".

\* cited by examiner

METAL STRUCTURE CATALYST AND PREPARATION METHOD THEREOF

CROSS-REFERENCE TO RELATED APPLICATION

This application claims priority to and the benefit of Korean Patent Application No. 2011-0075982, filed Jul. 29, 2011, Application No. 2012-0077734, filed Jul. 17, 2012, the disclosure of which is incorporated herein by reference in its entirety.

BACKGROUND

1. Field of the Invention

The present invention relates to a metal structure catalyst and a method of preparing the same.

2. Discussion of Related Art

In conventional chemical processes (preparation of hydrogen, hydrodesulfurization, etc.), a packed bed catalyst reactor has been mainly used. Conventionally, a packing tower reactor enabling reaction heat of a high temperature has problems of fundamental disadvantages of a ceramic (alumina, cordierite, etc.)-supported catalyst, including a decrease in catalyst utilization efficiency due to a low heat and mass transfer rate and an increase in reactor volume according thereto.

Xu and Froment explains that, since an actual steam reforming reaction has a catalyst effectiveness factor of approximately 0.03, a mass transfer resistance through a catalyst pore is very high [AIChE J, Jianguo Xu and Gilbert F. Froment, Methane steam reforming, methanation and water-gas shift: I. Intrinsic kinetics, 35, 1989, 97]. In addition, a packed bed catalyst reactor has problems of degradation in reactor performance according to high pressure drop and a channeling of a reactant, and a slow response characteristic according to initial starting time and load fluctuation by a low thermal conductivity of a ceramic catalyst.

To overcome the pressure loss of the conventional packing tower catalyst reactor, a structure composed of a channel was used as a catalyst supporter. In a high temperature endothermic reaction process, for example, a reforming reactor, a metal structure having an excellent heat transfer characteristic, rather than a structure formed of a ceramic material which is vulnerable to a thermal shock, was employed as a catalyst supporter [Korean Patent Application No. 1993-0701567 and 2003-0067042].

A general metal structure has a boundary layer formed on an inner surface of a channel due to characteristics of the long channel including a cell density of approximately 200 to 400 cpi and a ratio (L/D) of a length to a diameter of the channel of approximately 70 to 120, and thus heat and mass transfer is limited and it is difficult to coat uniformly the channel with a catalyst due to a capillary phenomenon.

Generally, types of a metal structure include a metal monolith, mat, form, and mesh. When a metal material is used as a catalyst support, due to physical binding and a difference in coefficients of thermal expansion between a metal and a ceramic carrier, a catalyst or a catalyst-supported carrier is detached from the metal structure at high temperature, and thus durability and activity of the catalyst are degraded.

To ensure thermal shock stability and to enhance an adhesive strength of the catalyst attached to a surface of the metal structure, a prior art relating to the conventional metal monolith structure catalyst has been developed.

In Korean Patent Application No. 2002-0068210, to enhance an adhesive strength between a metal surface and a catalyst, aluminum metal particles were primarily coated on a surface of a metal structure as a protective layer for preventing metal corrosion, and aluminum metal particles serving as carriers were secondarily coated thereon in a porous shape. An inter-layer alloy is formed according to thermal treatment after coating each layer, and thus cracks and detachment are prevented. In addition, a metal-metal oxide layer is formed by oxidation at high temperature. Finally, a monolith-type catalyst module including a metal structure was manufactured by attaching a catalyst to a metal oxide layer by a wash coating method.

In addition, in Korean Patent Application No. 2005-0075362, to improve an adhesive strength between a substrate and a catalyst, the same material as the catalyst or a material having the same surface characteristic as the catalyst was coated at an interface between the substrate and the catalyst as an adhesive layer by performing atomic layer deposition (ALD) or chemical vapor deposition (CVD) on a surface of the substrate. This technique has an advantage in that uniform coating to a desired thickness is possible regardless of the kind and shape of a substrate. However, a metal oxide is formed by repeatedly forming M-OH (M: metal) bonds by a reaction between a hydroxyl group on a surface of a metal and a metal precursor. Due to the limitation to a specific metal precursor capable of forming a M-O-M bond by a reaction with a hydroxyl group, the use of expensive reaction equipment and performance under a vacuum, there is a limitation to ease of utilization of the art and compatibility. For reference, here, the catalyst was wash-coated by being mixed with alumina sol.

In Korean Patent No. 835046 and 670954, a catalyst was carried to a porous catalyst support (metal foam, ceramic foam, metal felt, metal screen, etc.). To enhance an adhesive strength between a metal surface and the catalyst, an interface layer (alumina, alumina+silica, titania) was coated on an oxidized FeCr alloy felt using metal organic chemical vapor deposition (MOCVD). Afterward, a powdery catalyst slurry was prepared and carried by wash-coating, or catalyst coating was performed by directly dipping into a precursor solution of an active metal. Such an intermediate layer has a similar component to a carrier layer, and is actually applied to a carrier of the catalyst, and the catalyst was generally coated by dip coating or wash-coating, chemical vapor deposition, or physical vapor deposition.

Korean Patent No. 696622, related to manufacture of a micro reforming reactor composed of a microchannel, pointed out that it was difficult to uniformly and selectively coat desired parts with conventional coating techniques, and a flow coating method was applied to coat a catalyst only on an inner wall of a microchannel. The flow coating method is a method of flowing a slurry coating solution of a powdery catalyst and injecting air, which may control a thickness of a coating layer depending on a viscosity of the coating solution and a rate of air injection. However, the method of this patent is also not that different from the conventional wash-coating method, and thus has a difficulty in uniform coating of a corner in the microchannel. In addition, when a thin catalyst layer is coated with a small amount of the catalyst due to the limitation on a coated amount according to a thickness of the catalyst layer and the influence of catalyst activity, catalyst performance is low, but when a large amount of catalyst is coated, the thick catalyst layer is detached, and thus catalyst performance may not be activated.

As described above, the conventional arts usually focused on formation of an inter-binding layer to enhance a binding strength between a metal surface and a carrier layer to solve a detachment phenomenon caused by a difference in coefficients of thermal expansion of the metal surface and a ceramic catalyst in order to develop a metal structure catalyst.

However, another problem is deactivation of a structure catalyst which may be caused by reducing an active surface area due to sintering of catalyst particles according to a thermal shock in a high temperature reforming reaction in which steam is actually present or a reaction startup-shutdown process. In addition, at a high gas hourly space velocity (GHSV) providing a large amount of reactants, only a active site exposed on a catalyst surface participates in the reaction, and therefore it is necessary to highly disperse catalyst on a surface of the metal support to develop a high-activity metal structure catalyst. Accordingly, in development of a metal structure catalyst having high activity and high durability, to enhance activity of the catalyst as well as to ensure high durability according to an enhanced binding strength between a surface of the metal support and a carrier, highly dispersed catalyst on a surface of the carrier is required.

Conventionally, in the manufacture of the metal structure catalyst, a method of impregnating a catalyst into a precursor solution of the catalyst to support the catalyst [L. Villegas, F. Masset, N. Guilhaume, 'Wet impregnation of alumina-wash-coated monoliths: Effect of the drying procedure on Ni distribution and on autothermal reforming activity', Applied Catalysis A: General, 320 (2007) 43-55] and a wash-coating method for coating a catalyst on a metal surface with a slurry solution prepared by mixing a powdery catalyst prepared by previously supporting a catalyst to a carrier with alumina sol [J. H. Ryu, K.-Y. Lee, H. La, H.-J. Kim, J.-I. Yang, H. Jung, 'Ni catalyst wash-coated on metal monolith with enhanced heat-transfer capability for steam reforming', Journal of Power Sources, 171 (2007) 499-505] have been used as representative catalyst coating methods.

The impregnation method has problems of an increase in a supporting number to support a certain amount of catalyst because of a low supporting amount of the catalyst and a difficulty in control of dispersion of active metal particles.

In addition, the wash-coating has a problem of a low binding strength between a coating layer and a metal structure because it cannot easily control a thickness of the coating layer and uniformly coat the coating layer, and a large amount of catalyst is needed due to high loss of a coating solution.

SUMMARY OF THE INVENTION

For these reasons, the present inventors conducted an investigation to solve the above-described problems of the conventional catalyst coating methods, and thus developed a method of preparing a metal structure catalyst having an enhanced binding strength between a catalyst carrier layer and a metal support by forming a metal precipitate on a metal support by contact of a mixed solution including a precursor of a metal catalyst and a precipitating agent with the metal support and performing thermal treatment to provide uniform highly dispersed metal nanoparticles. Thereby, the present invention was completed.

The present invention is directed to providing a method of preparing a metal structure catalyst including forming a metal precipitate on a metal support by contact of a mixed solution including a precursor of a metal catalyst and a precipitating agent with the metal support, and forming metal particles by thermally treating and reducing the metal precipitate formed on the metal support.

The present invention is directed to providing a metal structure catalyst prepared by the above-described method, and satisfying Equation 1.

$$X \geq 0.0004 \qquad \text{[Equation 1]}$$

Here, X represents a metal-supported amount per unit area ($g/cm^2$) in 150 mM of a metal precursor solution.

The present invention is directed to providing a metal structure catalyst including a metal supporter, a metal oxide layer formed on the metal supporter, and metal nanoparticles formed on the metal oxide layer, and satisfying Equation 1.

$$X \geq 0.0004 \qquad \text{[Equation 1]}$$

Here, X represents a metal-supported amount per unit area ($g/cm^2$) in 150 mM of a metal precursor solution.

The present invention is directed to providing a method of producing hydrogen including producing hydrogen using the metal structure catalyst.

One aspect of the present invention provides a method of preparing a metal structure catalyst including forming a metal precipitate on a metal support by contact of a mixed solution including a precursor of a metal catalyst and a precipitating agent with the metal support, and forming metal particles by thermally treating and reducing the metal precipitate formed on the metal support.

Another aspect of the present invention provides a metal structure catalyst prepared by the above-described method, and satisfying Equation 1.

$$X \geq 0.0004 \qquad \text{[Equation 1]}$$

Here, X represents a metal-supported amount per unit area ($g/cm^2$) in 150 mM of a metal precursor solution.

Still another aspect of the present invention provides a metal structure catalyst including a metal support, a metal oxide layer formed on the metal support, and metal nanoparticles formed on the metal oxide layer, and satisfying Equation 1.

$$X \geq 0.0004 \qquad \text{[Equation 1]}$$

Here, X represents a metal-supported amount per unit area ($g/cm^2$) in 150 mM of a metal precursor solution.

Yet another aspect of the present invention provides a method of producing hydrogen including producing hydrogen using the metal catalyst.

BRIEF DESCRIPTION OF THE DRAWINGS

The above and other objects, features and advantages of the present invention will become more apparent to those of ordinary skill in the art by describing in detail exemplary embodiments thereof with reference to the adhered drawings, in which.

DETAILED DESCRIPTION OF EXEMPLARY EMBODIMENTS

Hereinafter, exemplary embodiments of the present invention will be described in detail. However, the present invention is not limited to the embodiments disclosed below, but can be implemented in various forms. The following embodiments are described in order to enable those of ordinary skill in the related art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, components and/or groups thereof, but do not preclude the presence or addition of one or more other features, integers, steps, operations, elements, components and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

The present invention relates to a method of preparing a metal structure catalyst including forming a metal precipitate on a metal support by contact of a mixed solution including a precursor of a metal catalyst and a precipitating agent with the metal support, and forming metal particles by thermally treating and reducing the metal precipitate formed on the metal support.

In the present invention, the metal catalyst may include, but is not limited to, at least one atom selected from the group consisting of nickel, ruthenium, platinum, rhodium, ceria and zirconia.

In the present invention, a precursor solution of the metal catalyst may be, but is not limited to, a metal nitrate, a metal halide, a metal acetate, a metal sulfate, a metal acetoacetate, a metal fluoroacetoacetate, a metal perchlorate, a metal sulfamate, a metal stearate, a metal phosphate, a metal carbonate, a metal oxalate and a metal complex (e.g., a metal EDTA).

In the present invention, the mixture of the precursor solution and the precipitating agent may provide the precipitating agent to the precursor solution at a certain rate, and may be prepared by simultaneously mixing the precursor solution and the precipitating agent. The precursor solution is prepared by mixing a precursor and water (distilled water).

In the present invention, the term "precipitating agent" refers to a reaction material used in a precipitating reaction for forming an insoluble solid (precipitate) by exchanging soluble ion materials, which is, for example, KOH, NaOH, ammonia, urea, $Na_2CO_3$, or $K_2CO_3$. Depending on the kind of metal, pH at which a precipitate is formed may be changed, particularly, to 8 to 14.

For the pH control, the precipitating agent may be used at 100 to 500 parts by volume, and preferably 300 to 500 parts by volume, with respect to 100 parts by volume of the metal precursor solution. As the pH of the mixed solution is changed according to a concentration or amount of the precipitating agent used herein, the size and type of a catalyst particle may be controlled.

In the present invention, the metal support may have one metal or an alloy of at least two metals selected from stainless steel, a FeCr alloy, aluminum and titanium, but the present invention is not limited thereto.

In addition, the metal support is formed in a type of a felt, mat, mesh, foam, foil or monolith.

The metal support may be formed by performing electrochemical surface treatment on a surface of the metal support in an electrolyte to form a metal oxide layer by controlling a supplied voltage and a concentration of the electrolyte, and performing thermal treatment in an oxidation atmosphere to crystallize an amorphous metal oxide layer formed on the metal support or only form a metal oxide layer of a specific metal component of an alloy. Additionally, before the surface treatment, washing may be performed on a surface of the metal support.

The electrochemical surface treatment refers to an operation of selecting one of a copper, iron and platinum coil as an anode, a metal support as a cathode, and one of 0.5 to 3 wt % of fluoric acid, phosphoric acid, sodium fluoride and sodium nitrate as an electrolyte or a combination thereof, and supplying 2 to 30 V of voltage between two electrodes at room temperature for 5 to 60 minutes.

The thermal treatment may be performed at 700 to 1,100° C. in an oxidation atmosphere.

The metal support may be manufactured by further coating an additional carrier on a metal oxide layer after the thermal treatment. The carrier may be, but is not limited to, alumina, bohemite, titania, silica or a ceria-zirconia mixture.

Detailed descriptions of the metal support used herein were described in Korean Patent No. 1019234.

In the present invention, the precipitate may be a metal hydroxide or a metal carbonate.

The formation of a metal precipitate may be performed at 25 to 100° C. for 0.5 to 90 hours, and preferably 60 to 90° C. for 10 to 72 hours. Here, in the aging process, aging temperature and time are changed according to the kind of the precipitating agent and the concentration and amount of the precursor solution. When the aging temperature is too low, a chemical reaction rate between the precipitating agent and the metal precursor solution is decreased, and thus primary nanoparticles are not easily produced. When the aging temperature is too high, the reaction is performed fast, and thus a size of the primary particle is difficult to control. In addition, when the aging process is performed for a very short time, the size of the primary particle may be decreased and crystal growth may not be easily performed, and when the aging process is performed for a very long time, the size of the particle may be increased.

In the present invention, the metal particles may be metal oxide nanoparticles.

In addition, the calcination for forming metal particles goes through thermal treatment and reduction, and the calcination in the thermal treatment may be performed at 300 to 900° C., and preferably 550 to 800° C. in an oxidation or reduction atmosphere. When the calcination is performed at less than 300° C., crystal growth of the nanoparticles does not occur, and when the calcination is performed at more than 900° C., the particle size is increased due to agglomeration of nanoparticles. The reduction is performed in a hydrogen atmosphere, and any reduction treatment method conventionally used in the preparation of the metal structure catalyst may be used.

The method of preparing a metal structure catalyst according to the present invention may be used to easily prepare metal structure catalysts having various sizes and types depending on the kind and concentration of the precipitating agent, aging time and temperature, and a temperature for thermal treatment after catalyst supporting (coating).

In addition, the present invention relates to a metal structure catalyst prepared by the above method, and satisfying Equation 1.

$$X \geq 0.0004 \quad \text{[Equation 1]}$$

Here, X represents a metal-supported amount per unit area (g/cm$^2$) in 150 mM of a metal precursor solution.

The present invention relates to a metal structure catalyst including a metal support, a metal oxide layer formed on the metal support, and metal nanoparticles formed on the metal oxide layer, and satisfying Equation 1.

$$X \geq 0.0004 \quad \text{[Equation 1]}$$

Here, X represents a metal-supported amount per unit area (g/cm$^2$) in 150 mM of a metal precursor solution.

In addition, the metal structure catalyst may satisfy Equation 2.

$$Y \geq 93 \quad \text{[Equation 2]}$$

Here, Y represents a methane conversion ratio (%) for a steam supply time of 70 hours in a natural gas steam reforming reaction in which reactants, steam and carbon, are supplied in a ratio of 3:1 at 700° C. and a GHSV of 15,000 h$^{-1}$.

In the present invention, the metal support may include one metal or an alloy material of at least two metals selected from stainless steel, FeCr alloy, aluminum and titanium, but the present invention is not limited thereto.

In addition, the metal support is formed in a type of a felt, mat, mesh, foam, foil or monolith.

The metal support may be manufactured by electrochemical surface treatment and thermal treatment. Alternatively, the metal support may be manufactured by coating an additional carrier on a metal oxide layer formed by additional electrochemical surface treatment and thermal treatment. The carrier may be, but is not limited to, alumina, boehmite, titania, silica or a ceria-zirconia mixture.

As described above, the metal nanoparticles are highly dispersed on the metal support after the precipitate formed by mixing the precipitating agent and the metal precursor is calcined and reduced (after the surface treatment and the thermal treatment).

One of the conventional methods of preparing a metal structure catalyst is an impregnation method in which a metal (e.g., Ni) is supported by dipping a metal structure on which a metal oxide (e.g., Al$_2$O$_3$) carrier layer is coated into a metal precursor (e.g., nickel nitrate) solution. In this method, a content of the metal coated on the carrier is affected by a specific surface area of the carrier layer, a concentration of the metal precursor solution and the number of dips. Generally, since an amount of supported metal in one coating is small, coating is necessarily repeated and thus it takes a long time to obtain a desired amount of a coated metal.

In addition, another of the conventional methods of preparing a metal structure catalyst is a wash-coating method, in which a metal support is dipped into or sprayed with a coating solution prepared by forming a powdery previously supported metal/metal oxide carrier (e.g., Ni/Al$_2$O$_3$) catalyst in a slurry. Before coating, a metal precursor solution is supported in a powdery carrier and then calcined, thereby preparing a powdery metal/metal oxide carrier catalyst. Generally, since a viscosity of the slurry coating solution has a large influence on a thickness of a catalyst coating layer, and the thickness is difficult to control, the catalyst is thickly coated. In addition, in the process of repeatedly coating the catalyst to obtain a desired amount of the catalyst, the coating layer becomes too thick and is easily detached because of thermal or mechanical shock caused by physical binding between the coating layers.

The method of preparing a metal structure catalyst according to the present invention makes up for the problems of the conventional methods described above. According to the method, unlike the impregnation method in which the amount of one coating is small and the amount or dispersion of the coated metal is difficult to control due to the influence of a specific surface area of the carrier, a precipitating agent is added to a metal precursor solution, and thus a particle size and a dispersion of a precipitate are easily controlled. In addition, due to the control of a concentration of the solution, an amount of coated metal (Ni) can be uniformly controlled, and a thickness of the coating layer is more easily controlled than the wash-coating method. Particularly, when a catalyst is repeatedly coated as much as desired, a metal/metal oxide (Ni/Al$_2$O$_3$) coating layer is re-coated on the previously formed metal/metal oxide (Ni/Al$_2$O$_3$) coating layer, and thus the thickness or surface of the coating layer is not uniform. Unlike the wash-coating method in which only the physical binding between the coating layers is formed, in the method according to the present invention, a precipitate (e.g., Ni(OH)$_2$) is formed on a surface of a metal oxide (e.g., Al$_2$O$_3$) carrier layer by dipping the metal support on which the metal oxide (e.g., Al$_2$O$_3$) carrier layer is coated into the metal precursor (e.g., Nickel nitrate) solution to which a precipitating agent is added and aging the metal support. Here, depending on a concentration of the metal precursor (e.g., nickel nitrate) solution, an amount of the precipitate supported (or coated) on a surface of the metal may be controlled. When the precipitate is calcined (through the reaction of Ni(OH)$_2$ ->NiO+ H$_2$O($\uparrow$)), moisture is evaporated, and thus only a metal oxide (e.g., NiO) is left, resulting in forming a coating layer only formed of the metal oxide (e.g., NiO) on a surface of the metal structure. The metal oxide (e.g., NiO) on a surface of the metal structure is converted into a metal (e.g., Ni) which serves as an active metal only when the metal structure goes through a reduction process in a H$_2$ atmosphere.

Accordingly, in the metal structure catalyst prepared by the method of preparing a metal structure catalyst of the present invention, metal particles are more uniform highly dispersed on the surface of the metal support having the metal oxide carrier layer, and a binding strength between the catalyst carrier layer and the surface of the metal support is higher than catalysts prepared by the conventional impregnating and wash-coating methods, which may be confirmed by an amount of metal impregnation per unit area and a methane conversion ratio in a steam reforming reaction.

For reference, in the preparation of the metal structure catalyst, surface treatment and carrier deposition for the metal support are performed in the order of (1) washing of the metal support, (2) electrochemical surface treatment, (3) thermal treatment, and (4) carrier coating, which follows the preparation method invented by the present inventors and disclosed in Korean Patent No. 1019234.

The metal structure catalyst according to the present invention may also be applied to hydrogen production.

The hydrogen production includes a steam reforming reaction, a water-gas shift (WGS), and a preferential oxidation (PROX) reaction.

Hereinafter, the present invention will be described in further detail with reference to Examples according to the present invention, but the scope of the present invention is not limited to the following Examples.

EXAMPLE 1

Supporting of Nickel Catalyst by Concentrations of Precursor Solution

In Samples 1 to 7 of Table 1, as described in Korean Patent No. 1019234, a metal oxide layer uniformly formed on a surface of a metal support through an electrochemical surface treatment process was used as a carrier. Without separate carrier deposition, a nickel catalyst, which was an active metal, was directly supported on the surface of the metal support.

40 parts by volume of an ammonia solution was added to 10 parts by volume of a nickel nitrate solution, which was a precursor of the nickel catalyst [to control pH to 12 to 13], and then a FeCr alloy mesh was dipped thereinto and aged at 90° C. for 10 hours (resulting in forming a precipitate $Ni(OH)_2$). After the aging, the sample was washed, and calcined at 700° C. in an oxidation atmosphere. After the calcination, a nickel-supported structure catalyst was prepared through a reduction process performed in a $H_2$ atmosphere.

Figure 1A:
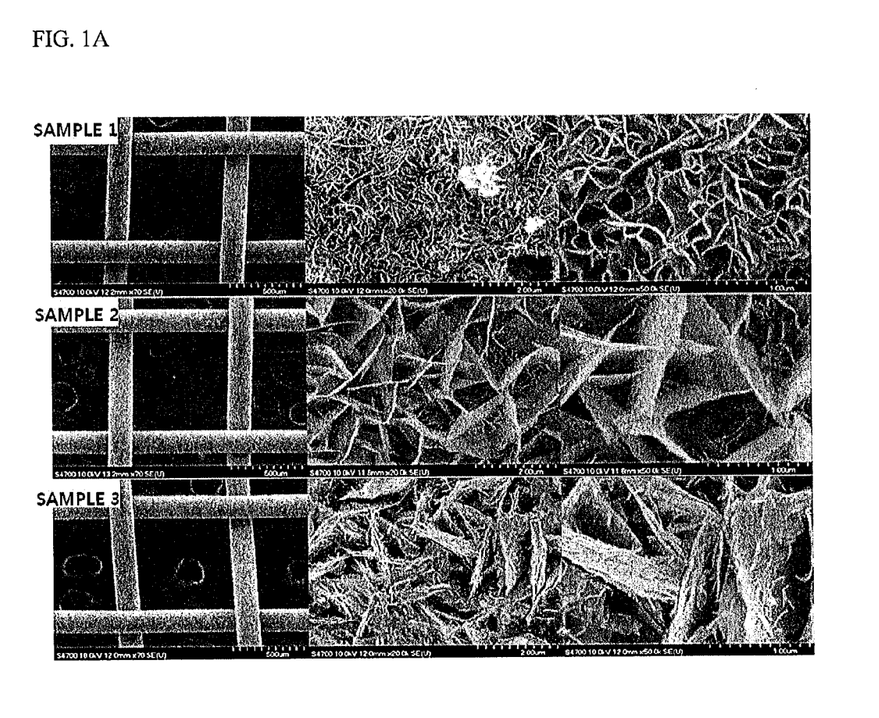
FIG. 1A shows scanning electron microscope (SEM) images of Samples 1 to 3 [left: ×70, middle: ×20,000, right: ×50,000]
Figure 1B:
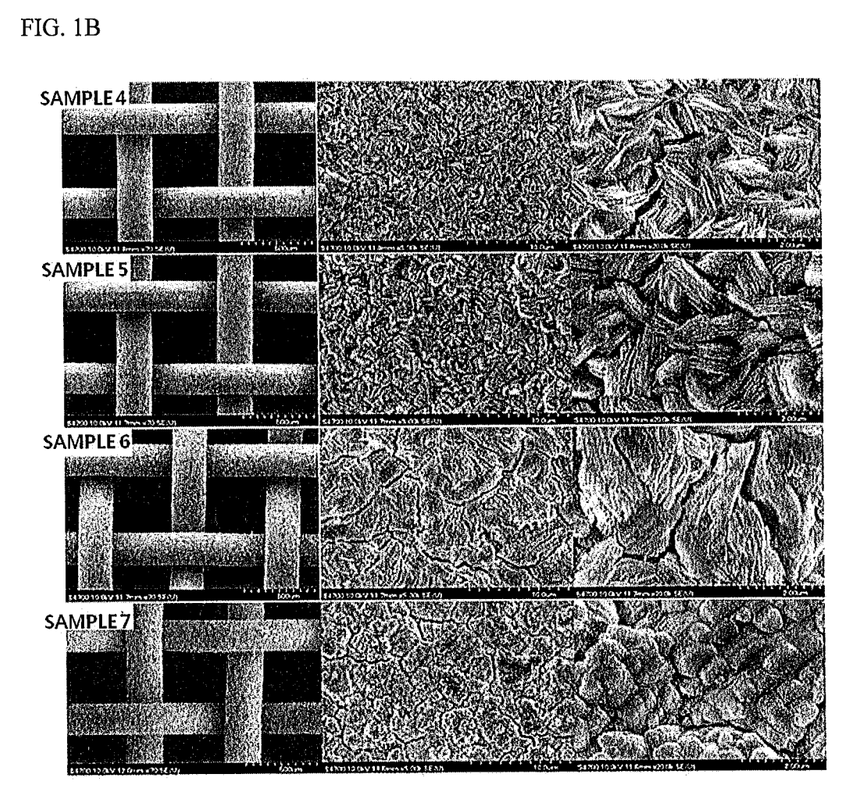
FIG. 1B shows SEM images of Samples 4 to 7 [left: ×70, middle: ×5,000, right: ×20,000]

FIG. 1 shows SEM images of Samples by concentrations of a precursor of a nickel catalyst, from which it was confirmed that a size of a plate-shape nickel oxide particle was increased according to an increase in concentration of nickel nitrate.

Until the concentration of nickel nitrate approached 50 mM, thin petal-shaped plate particles having a thickness of 20 nm or less were non-uniformly formed, but when the concentration of nickel nitrate was 100 mM or more, the particles had a smaller thickness and became denser, thereby being formed into a sponge type. When the concentration of nickel nitrate was 1 M, hexagonal plate-shape particles were grown in a certain direction.

Table 1 shows results of composition analysis for Samples after nickel supporting. The composition analysis of Samples was performed through Energy Dispersive Spectrometery (EDS). It was confirmed that the concentration of nickel supported on a surface was also increased according to the increase in the concentration of nickel nitrate.

TABLE 1

| Sample | Concentration of Ni Precursor Solution (mM) | Atomic (%) | | | | | |
|---|---|---|---|---|---|---|---|
| | | Al | Cr | Fe | Ni | O | Si |
| 1 | 10 | 16.6 | 5.1 | 13.6 | 8.7 | 56.0 | — |
| 2 | 20 | 14.3 | 3.4 | 8.4 | 12.7 | 57.6 | 3.6 |
| 3 | 50 | 4.3 | 1.2 | 3.3 | 33.1 | 58.1 | — |
| 4 | 100 | 1.8 | 1.5 | 3.3 | 39.4 | 54.0 | — |
| 5 | 150 | 0 | 0 | 2.3 | 40.9 | 53.3 | 3.5 |
| 6 | 300 | 0.2 | 0.7 | 2.5 | 46.6 | 50.0 | — |
| 7 | 1000 | 0 | 0 | 1.6 | 56.3 | 42.1 | — |

EXAMPLE 2

Supporting of Nickel Catalyst by Type of Metal Supporter

In Samples 8 to 10, highly dispersed support of a nickel catalyst was performed with various types of metal support. Mesh, foil and monolith-type FeCr alloy materials were selected as metal support, and an alumina carrier was deposited on an alumina layer uniformly formed through electrochemical surface treatment and thermal treatment, as described in Korean Patent No. 1019234.

To support the nickel catalyst, which was an active metal, 80 parts by volume of an ammonia solution was added to 20 parts by volume of a nickel nitrate solution having a concentration of 300 mM [to control pH to 12 to 13], and then a metal support was dipped thereinto and aged at 90° C. for 10 to 40 hours (resulting in forming a precipitate $Ni(OH)_2$). After the aging, the sample was washed, and calcined at 700° C. in an oxidation atmosphere. After the calcination, a nickel-supported structure catalyst was prepared through a reduction process performed in a $H_2$ atmosphere.

Figure 2:
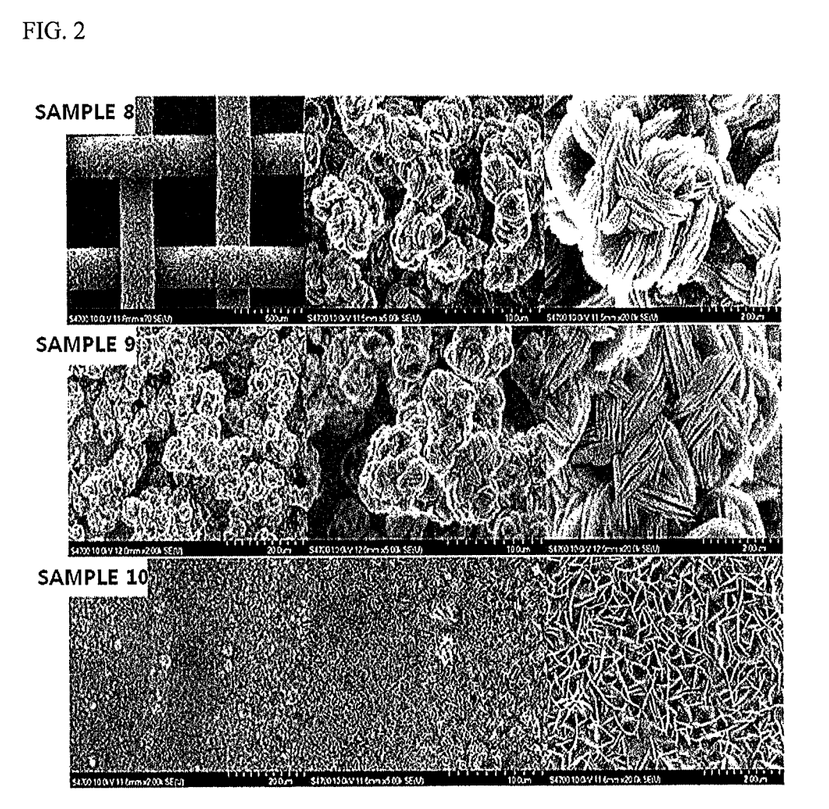
FIG. 2 shows SEM images of highly dispersed nickel catalyst particles in a metal support, which is a mesh (Sample 8), foil (Sample 9) or monolith (Sample 10) type.

FIG. 2 shows SEM images to examine a shape of a nickel catalyst particle, which were highly dispersed on a mesh (Sample 8), foil (Sample 9) or monolith (Sample 10)-type metal support on which an alumina carrier was deposited as an alumina layer uniformly formed through surface treatment and thermal treatment. It was confirmed that petal-shaped thin plate-type particles having a thickness of 50 nm or less were densely formed on a surface of the monolith (Sample 10)-type metal support, and primary plate particles were jammed on a surface of the mesh (Sample 8) or foil (Sample 9)-type metal support and then thin plate particles were grown in the form of tangled threads. The reason that the nickel catalyst particles formed on the mesh and foil surfaces were grown in a three-dimensional shape in bulk was smaller coating areas of the mesh and foil-type metal support than the monolith-type metal support, which had a larger surface area.

Table 2 shows amounts of coated catalysts per unit area by types of the metal support, which were measured with Formula 1.

$$\text{Supported Amount (g/cm}^2\text{)}=(w_1-w)/A \quad \text{[Formula 1]}$$

Here, w is a weight of the metal support, $w_1$ is a weight of the coated metal support, and A is an area of the coated metal support.

TABLE 2

| Categories | Sample 8 (g/cm²) | Sample 9 (g/cm²) | Sample 10 (g/cm²) |
|---|---|---|---|
| Nickel-Supported Amount per Unit Area (g/cm²) | 0.0007 | 0.0009 | 0.0010 |

EXAMPLE 3

Nickel-Supported Metal Monolith Catalyst

In Samples 11 to 14, nickel catalysts were supported on monolith-type metal support of a FeCr alloy material by concentrations. As described in Korean Patent No. 1019234, an alumina carrier was deposited on an alumina layer uniformly formed through electrochemical surface treatment and thermal treatment.

A concentration of a nickel nitrate solution was 100 to 1000 mM, 80 parts by weight of an ammonia solution was added to 20 parts by weight of a nickel catalyst precursor solution [to control pH to 12 to 13], and aging was performed at 90° C. for 40 hours (resulting in forming a precipitate $Ni(OH)_2$). After the aging, Samples were washed, and calcined at 700° C. in an oxidation atmosphere. After the calcination, a nickel-supported structure catalyst was prepared through a reduction process performed in a $H_2$ atmosphere.

Table 3 shows nickel-supported amounts per unit area in nickel-supported metal monolith catalysts with various concentrations.

TABLE 3

| Categories | Sample 11 | Sample 12 | Sample 13 | Sample 14 |
|---|---|---|---|---|
| Concentration of Nickel Precursor Solution (mM) | 100 | 150 | 300 | 1000 |
| Amount of Nickel Precursor (g) | 0.0291 | 0.0436 | 0.0872 | 0.2908 |
| Nickel-Supported Amount per Unit Area (g/cm$^2$) | 0.0003 | 0.0005 | 0.0010 | 0.0030 |

Figure 3A:
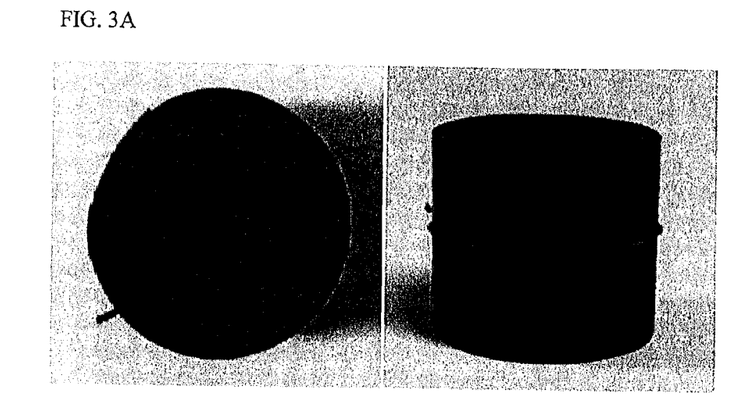
FIG. 3A shows top and side images of a metal monolith catalyst of Sample 11.
Figure 3B:
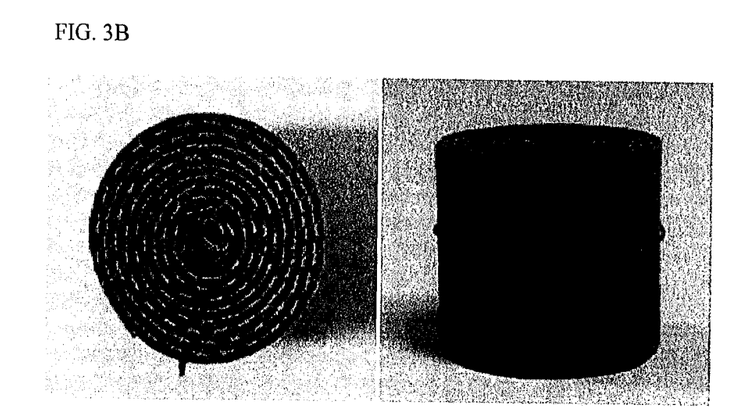
FIG. 3B shows top and side images of a metal monolith catalyst of Sample 12.
Figure 3C:
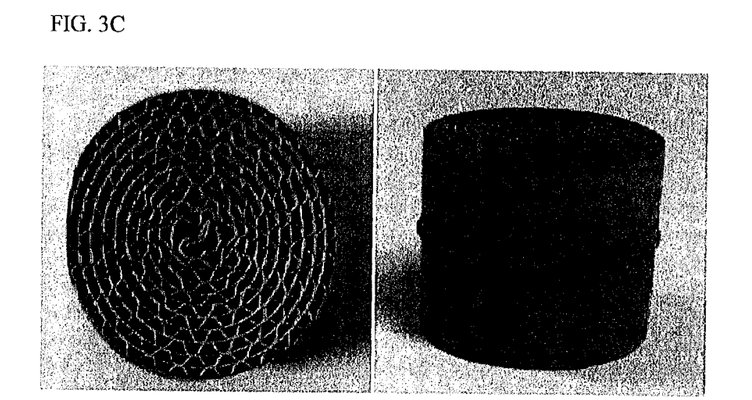
FIG. 3C shows top and side images of a metal monolith catalyst of Sample 14.

FIG. 3 shows top and side images of a metal monolith catalyst by concentrations of the nickel precursor solution. It was confirmed that the nickel catalyst was uniformly coated at both an inlet and a side surface of the monolith without blockage or agglomeration.

COMPARATIVE EXAMPLE 1

Supporting by Impregnating Method (Korean Patent No. 1019234)

Sample 15 was prepared by supporting a nickel catalyst on a metal support (a mesh-type of a FeCr alloy material) by an impregnating method to examine the influence of the method of supporting the nickel catalyst. Electrochemical surface treatment and deposition of an alumina carrier were performed on the metal support in the same manners as described above. The metal support coated with the alumina carrier was supported on nickel nitrate solutions (150 and 300 mM), which were nickel catalyst precursors, by an impregnating method (this process was repeated several times to support a desired amount of nickel because of a small nickel-supported amount in one process), and calcined at 700° C. After the calcination, a nickel-supported structure catalyst was prepared through a reduction process in a $H_2$ atmosphere [nickel-supported amount in 300 mM of nickel precursor solution: 0.00054 g/cm$^2$] (at 200 mM or less of the nickel precursor solution, a nickel-supported amount was too small to be measured).

In addition, when the nickel catalyst was supported on a metal monolith type by an impregnating method, a nickel-supported amount was 0.00021 g/cm$^2$ at 300 mM of the nickel precursor solution (at 200 mM or less of the nickel precursor solution, a nickel-supported amount was too small to be measured).

Figure 4:
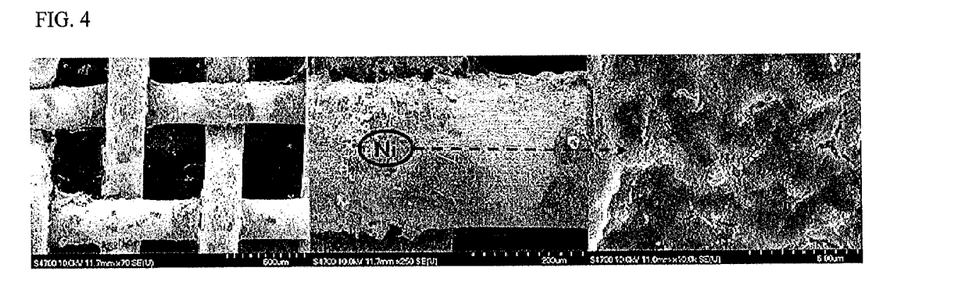
FIG. 4 shows SEM images obtained by analyzing a surface of a nickel-supported (coated) mesh obtained by an impregnation method.

FIG. 4 shows SEM images obtained by analyzing a surface of a mesh on which nickel was supported by an impregnating method. Nickel was non-uniformly supported on a surface of the mesh, and nickel particles usually agglomerated at crossed parts. Detachment of a thick nickel catalyst layer was observed. Alternatively, it was confirmed that in Sample 6 on which 300 mM of a nickel precursor solution was supported in the same manner as described in the method of preparing a metal catalyst according to the present invention, overall, a nickel catalyst was dispersed uniformly and highly.

COMPARATIVE EXAMPLE 2

Supporting by Wash-Coating Method

Sample 16 was prepared by coating a nickel catalyst $Ni/MgAl_2O_4$ on a monolith of a FeCr alloy material by a wash-coating method.

Electrochemical surface treatment and deposition of an alumina carrier were performed on the metal support in the same manner as described above, and a slurry solution prepared by mixing a powdery catalyst with alumina in a ratio of 1:1 was wash-coated and calcined at 700° C. After the calcination, a nickel-supported structure catalyst was prepared through a reduction process in a $H_2$ atmosphere [nickel-supported amount with 1.795 g of nickel precursor: 0.0007 g/cm$^2$].

EXPERIMENTAL EXAMPLE

Evaluation of Performance of Metal Catalyst

To evaluate performance of catalysts depending on supporting (or coating) methods, a natural gas steam reforming reaction for producing hydrogen was performed.

The reaction was performed under conditions including a reaction temperature of 700° C., a ratio of vapor to carbon, which served as reactants, of 3:1, and a GHSV of 15,000 h$^{-1}$.

Figure 5A:
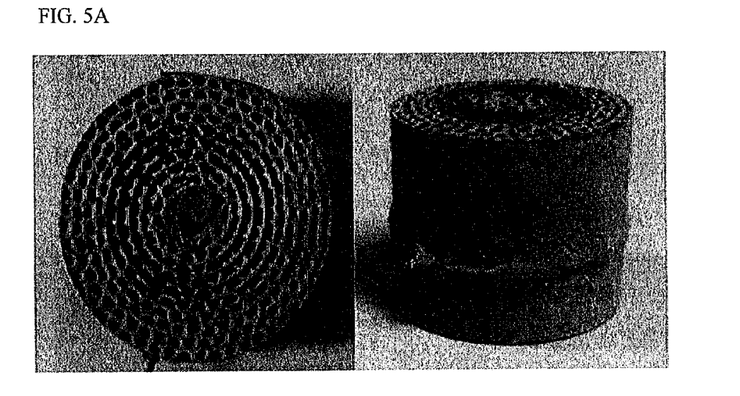
FIG. 5A shows images of Sample 16 prepared by wash-coating a Ni/$MgAl_2O_4$ catalyst.

FIG. 5A shows images of Sample 16 prepared by wash-coating a $Ni/MgAl_2O_4$ catalyst.

It was confirmed that, compared to Sample 12 (150 mM) having a similar Ni-supported amount, an inlet of the monolith catalyst (Sample 16) prepared by wash-coating was blocked and a catalyst layer was thickly coated on a surface of the monolith catalyst.

Figure 5B:
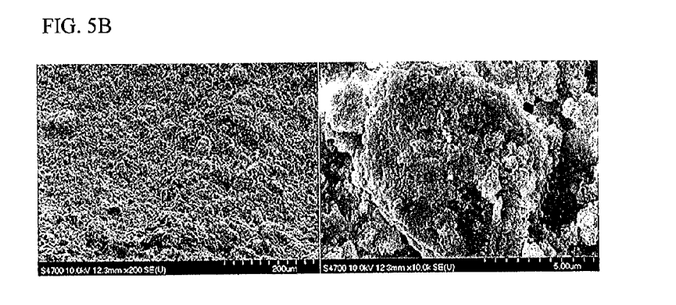
FIG. 5B shows SEM images of a surface of the washcoated metal monolith catalyst (Sample 16) [left: ×200, right: ×10,000]

FIG. 5B shows SEM images of the wash-coated surface of the metal monolith catalyst (Sample 16).

Unlike Sample 12 of Example 3, it was confirmed that in Comparative Example 2 (Sample 16) prepared by wash-coating, coarse $Ni/MgAl_2O_4$ catalyst particles agglomerated.

Figure 6:
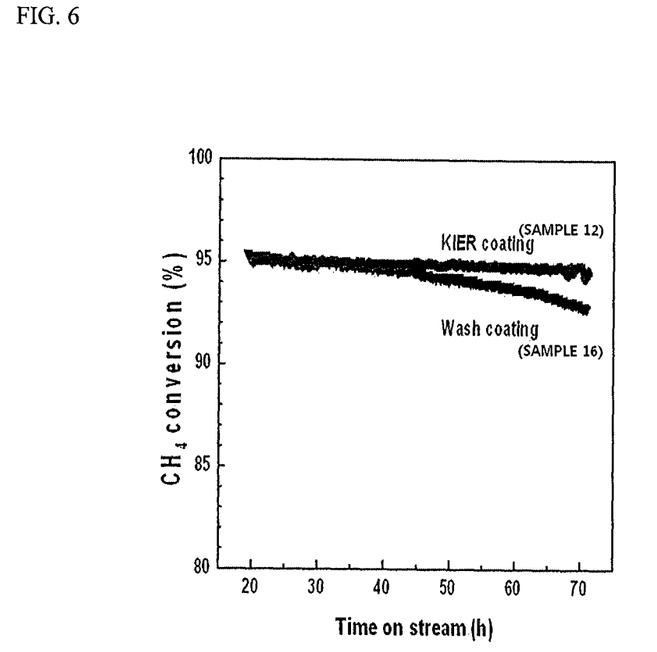
FIG. 6 shows a result obtained by applying Sample 12 of Example 3 and Sample 16 of Comparative Example 2 to compare the performance of catalysts according to supporting (-coating) method influence.

FIG. 6 shows results obtained by applying Samples 12 and 16 to a steam reforming reaction to compare performance of the catalyst according to supporting method influences.

Sample 12 of Example 3 showed high catalyst activity and stable long-term durability despite a smaller nickel-supported amount than Comparative Example 2 (Sample 16) using the conventional wash-coating method.

That is, in Sample 12, a methane conversion ratio at the time of 70 hours was maintained 93% or more. Here, in the case using the impregnating method, since a supported amount in one process was too small and it took too long to obtain a catalyst, separate evaluation of performance was not performed.

The present invention is a follow-up invention of Korean Patent No. 1019234, and relates to a metal structure catalyst to enhance performance of a metal catalyst and a method of preparing the same.

According to the present invention, unlike the conventional catalyst coating methods, to maximize a specific surface area of the catalyst participating in a reaction, a metal structure catalyst having a nano-sized three-dimensional structure is prepared, a supported amount can be easily controlled without the type and size of a metal support, and the catalyst can be dispersed uniformly and highly.

While the invention has been shown and described with reference to certain exemplary embodiments thereof, it will be understood by those skilled in the related art that various changes in form and details may be made therein without departing from the scope of the invention as defined by the appended claims.

What is claimed is:

1. A method of preparing a metal structure catalyst comprising the steps of:
   directly forming a metal precipitate on a metal support by direct contact of a mixed solution with the metal support, the mixed solution including a precursor of a metal catalyst and a precipitating agent being an ammonia solution; and
   forming metal particles by thermally treating and reducing the metal precipitate formed on the metal support;
   wherein the metal catalyst is nickel;
   wherein the forming of the metal precipitate is performed at 60 to 100° C. for 10 to 90 hours.

2. The method according to claim 1, wherein a precursor solution of the metal catalyst is at least one selected from the group consisting of a metal nitrate, a metal halide, a metal acetate, a metal sulfate, a metal acetoacetate, a metal fluoroacetoacetate, a metal perchlorate, a metal sulfamate, a metal stearate, a metal phosphate, a metal carbonate, a metal oxalate and a metal complex.

3. The method according to claim 1, wherein the precipitating agent controls a pH of the mixed solution to 8 to 14.

4. The method according to claim 1, wherein the precipitating agent is used at 100 to 500 parts by volume with respect to 100 parts by volume of the metal precursor solution.

5. The method according to claim 1, wherein the metal support is one metal or an alloy of at least two metals selected from stainless steel, a FeCr alloy, aluminum and titanium.

6. The method according to claim 1, wherein the metal support is formed in a type of a felt, mat, mesh, foam, foil or monolith.

7. The method according to claim 1, wherein the metal support is formed by performing electrochemical surface treatment, and thermal treatment in an oxidation atmosphere.

8. The method according to claim 7, wherein the metal support is formed by further coating a carrier after the thermal treatment.

9. The method according to claim 8, wherein the carrier is alumina, boehmite, titania, silica or a ceria-zirconia mixture.

10. The method according to claim 1, wherein the precipitate is a metal hydroxide or a metal carbonate.

11. The method according to claim 1, wherein the metal particles are metal oxide nanoparticles.

12. The method according to claim 1, wherein the thermal treatment is performed at 300 to 900° C. in an oxidation or reduction atmosphere.

* * * * *